(12) United States Patent
Sasaki et al.

(10) Patent No.: US 8,192,094 B2
(45) Date of Patent: Jun. 5, 2012

(54) OPTICAL MODULE

(75) Inventors: Kazuya Sasaki, Kawasaki (JP); Makoto Miyoshi, Kawasaki (JP); Shinichi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 12/458,785

(22) Filed: Jul. 22, 2009

(65) Prior Publication Data

US 2009/0285536 A1 Nov. 19, 2009

Related U.S. Application Data

(63) Continuation of application No. PCT/JP2007/055186, filed on Mar. 15, 2007.

(51) Int. Cl.
*G02B 6/36* (2006.01)
(52) U.S. Cl. ........................................................ 385/92
(58) Field of Classification Search ..................... 385/92
See application file for complete search history.

(56) References Cited

U.S. PATENT DOCUMENTS

2002/0181853 A1* 12/2002 Ido et al. ............................ 385/19
2006/0257079 A1* 11/2006 Ohtsuka et al. ................... 385/86

FOREIGN PATENT DOCUMENTS

| JP | 61-132805 | 8/1986 |
|---|---|---|
| JP | 04-042105 | 2/1992 |
| JP | 04-196369 | 7/1992 |
| JP | 09-178984 | 7/1997 |
| JP | 2002-250840 | 9/2002 |
| JP | 2006-178384 | 7/2006 |

OTHER PUBLICATIONS

International Search Report issued on Apr. 10, 2007 in corresponding PCT Application No. PCT/JP2007/055186.

* cited by examiner

*Primary Examiner* — Uyen Chau N Le
*Assistant Examiner* — Hoang Tran
(74) *Attorney, Agent, or Firm* — Staas & Halsey LLP

(57) ABSTRACT

An optical module includes a housing including a groove part formed inside the housing; and a receptacle received in the housing, the receptacle to which an optical connector having an optical fiber is connected, the receptacle including a brim part and a stub part where the brim part is formed in a body. An elastic body is provided in the groove part, the groove part where the brim part is provided. The elastic body is configured to adhere to and hold the stub part.

8 Claims, 9 Drawing Sheets

OPTICAL MODULE

CROSS-REFERENCE TO RELATED APPLICATIONS

This patent application is based upon and claims the benefit of priority under 35 USC 120 and 365(c) of PCT application JP2007/55186 filed in Japan on Mar. 15, 2007, the entire contents of which are incorporated herein by reference.

FIELD

The embodiments discussed herein are related to optical modules.

BACKGROUND

In an optical module, such as a light emitting module or a light receiving module used for an optical communication device or the like, a light emitting element or a light receiving element such as a laser diode or a photo diode and other components are received in a receptacle. The receptacle can be manufactured at low cost and be handled easily. The light emitting element or the light receiving element and other components are connected to lead terminals by wires or the like for supplying signals or electric power.

In recent large scale optical communication devices, for example, a large number of the optical modules are provided in an optical module mounting part in parallel so that parallel transmission of a large number of optical signals is realized.

FIG. 1 is a schematic cross-sectional view illustrating a structure of a related art optical module.

Referring to FIG. 1, at the time of communication, an external line optical cable 2 is connected to an optical module 1 such as a light emitting module or a light receiving module used for an optical communication device or the like.

The optical module 1 includes a housing 3 made of metal. A receptacle 4 and an optical connector 5 are provided inside the housing 3. An optical semiconductor element (not illustrated) which is a light emitting element or a light receiving element such as a laser diode or a photo diode is provided inside the receptacle 4. The optical connector 5 is provided at a head end part of the external line optical cable 2.

The receptacle 4 having an inside where a ferrule 6 is received includes a first stub part 4a, a brim part 4b, and a second stub part 4c. The first stub part 4a is provided at a head end side of the receptacle 4. The first stub part 4a is provided in a concave part of the optical connector 5 and configured to guide an internal surface of the concave part. The brim part 4b has a diameter greater than that of the first stub part 4a. The second stub part 4c has a diameter greater than that of the first stub part 4a and smaller than that of the brim part 4b. The second stub part 4c is provided at the optical semiconductor element side. The ferrule 6 is provided inside the second stub part 4c and holds the brim part 4b.

A convex part 7 is provided at a part of the inside the housing 3, the part being where the first stub part 4a, the brim part 4b, and the second stub part 4c of the receptacle 4 are positioned. In addition, a groove part 8 is formed in the convex part 7. The receptacle 4 is provided inside the housing 3 so that the brim part 4b is positioned in the groove part 8.

The optical semiconductor element provided inside the receptacle 4 is connected to a printed wiring board 9 via a flexible wiring board 10. An LSI (Large Scale Integrated Circuit) and others are provided on the printed wiring board 9.

On the other hand, an external surface of the optical connector 5 is guided by an internal wall part of the housing 3. In addition, a ferrule 11 is provided inside the optical connector 5. The ferrule 11 has a cylindrical-shaped configuration so that the external line optical cable 2 is held and fixed.

The ferrules 6 and 11 are arranged precisely by a line sleeve 12 so as to stand in a row. The line sleeve 12 is formed inside the first stub part 4a, the brim part 4b and the second stub part 4c. By connecting the ferrules 6 and 11 to each other, the optical semiconductor element provided in the receptacle 4 and the optical connector 5 are optically and precisely connected to each other.

Under this structure, the ferrules 6 and 11 are connected to each other by fixing the center of the receptacle 4 where the ferrule 6 is received in a center position of the housing 3 and inserting and engaging the optical connector 5 provided at the head end part of the external line optical cable 2 to the housing 3. As a result of this, the optical semiconductor element provided in the receptacle 4 and the optical connector 5 are optically and precisely connected to each other and thereby optical communications are performed.

An optical receptacle having the following structure is described in Japanese Laid-Open Patent Application Publication No. 2006-178384. The optical receptacle has a blind-cup shaped metal holder having an opening part in which a through-hole is formed on the bottom surface; a fiber-stub in which an optical fiber is fixed on the center of a ferrule and the back end part is inserted and fixed into the through-hole of the metal holder; a split sleeve for inserting a tip part of the fiber-stub from one side opening end part, abutting the plug ferrule inserted from the other side opening end part to the top end surface of the fiber-stub and clamping the fiber-stub; and a tubular case. A pin abutted to the outer peripheral surface of the split sleeve, which is extended by inserting the plug ferrule into the split sleeve, is attached to the inner peripheral surface of the case.

An optical fiber connector is described in Japanese Laid-Open Patent Application Publication No. 2002-250840. A reinforcing sleeve is arranged on the outside of a split sleeve for aligning an optical fiber, with a float-structure clearance provided for a sleeve holder and a sleeve. In addition, the sleeve is given a double structure with the ceramic split sleeve and the metallic reinforcing sleeve.

However, there is dimensional tolerance (clearance) in each of components forming the optical module 1. Therefore, it is difficult to fix with high precision and maintain the center of the receptacle 4 where the ferrule 6 is received to the center position of the housing 3 which is an ideal fixing position.

Because of this, problems illustrated in FIG. 2 through FIG. 5 may occur. FIG. 2 through FIG. 5 are first through fourth views for explaining problems of the optical module 1 illustrated in FIG. 1. FIG. 3 is a cross-sectional view taken along a line C-C of FIG. 2. For the convenience of explanation, a position of the second stub part 4c of the receptacle 4 is illustrated in FIG. 3. An example where two receptacles 4 are provided in a single housing 3 is illustrated in FIG. 3.

The following are ideal. The brim parts 4b of the receptacles 4 are positioned, without gaps, in the groove part 8 formed in the convex part 7 provided inside the housing 3. The centers of the receptacles 4 where the ferrules 6 are received in the center position of the housing 3 with high precision. In addition, the centers of the receptacles 4, namely the centers of the ferrules 6 are consistent with the center of the ferrule 11 provided inside the optical connector 5.

However, since there is dimensional tolerance (clearance) in each of components forming the optical module 1, as illustrated in FIG. 2, a gap is formed inside the groove part 8 where the brim part 4b of the receptacle 4 is provided. The center position (indicated by one dotted line A in FIG. 2) of the ferrule 6 provided inside the receptacle 4 may not be consistent with the center position (indicated by one dotted line B in FIG. 2) of the ferrule 11 provided inside the optical connector 5.

As a result of this, a gap between a position of an optical axis of the ferrule 6 provided inside the receptacle 4 and a position of an optical axis of the ferrule 11 provided inside the optical connector 5 is generated so that coupling loss may be generated.

Details of this are discussed with reference to FIG. 3.

It is ideal that each of center positions in vertical and horizontal directions of the brim part 4b of the receptacle 4 provided in the groove part 8 and the second stub part 4c of the receptacle 4 inserted in a second stub part receiving hole 13 is consistent with center positions (indicated by one-dotted center lines in FIG. 3) in the vertical and horizontal directions of the housing 3. This ideal state is illustrated by solid lines in FIG. 3. A thick solid line indicates an ideal position of the brim part 4b. A thin solid line indicates an ideal position of the second stub part 4c.

However, due to the dimensional tolerance (clearance), the brim part 4b may be formed in a position indicated by the thick dotted line in FIG. 3. The second stub part 4c may be formed in a position indicated by the thin dotted line in FIG. 3. In an example illustrated at the left side in FIG. 3, the brim part 4b and the second stub part 4c are provided in a position shifted in the vertical direction by distance y from the ideal position. In an example illustrated at the right side in FIG. 3, the brim part 4b and the second stub part 4c are provided in a position shifted to the right side in the horizontal direction by distance x from the ideal position.

As a result of this, a gap may be formed between a position of the optical axis of the ferrule 6 provided inside the receptacle 4 and a position of the optical axis of the ferrule 11 provided inside the optical connector 5, so that coupling loss of light may be generated.

Furthermore, in a case where large numbers of the optical modules 1 are mounted in parallel in the optical module mounting part for realizing the parallel transmission of a large number of optical signals, plural external line optical cables 2 to be connected to the optical modules 1 are collected together. Accordingly, a stress (bending moment) in the direction indicated by an arrow in FIG. 4 is applied to several of the external line optical cables 2 due to own weights of the external line optical cables 2.

Accordingly, since the receptacle 4 provided inside the housing 3 is mechanically fixed to the housing 3, due to the stress of the optical connector 5, a shift may be generated between the position of the optical axis of the ferrule 6 provided inside the receptacle 4 and the position of the optical axis of the ferrule 11 provided inside the optical connector 5, so that coupling loss of light may be generated and degradation of the optical output may be caused.

In addition, as illustrated in FIG. 5, in the optical module 1, the following are required for achieving a proper operation. That is, it is necessary to achieve reduction of radiation of electromagnetic waves indicated by black arrows in FIG. 5 from electronic components inside the optical module 1. In addition, a designated load bearing capacity against influence indicated by a white arrow in FIG. 5 of surges from outside of the optical module 1 is required.

Because of this, in the groove part 8 where the brim part 4b of the receptacle 4 is provided and the second stub part receiving hole 13 where the second stub part 4c of the receptacle 4 is inserted, it is necessary to provide the brim part 4b of the receptacle 4 and the second stub part 4c which are electric conductive bodies without forming gaps. The brim part 4b of the receptacle 4 and the second stub part 4c form a shield part indicated by a dotted line in FIG. 5 against the electromagnetic waves. By the shield part, as indicated by black arrows in FIG. 5, it is necessary to reduce the influence of EMI (Electro Magnetic Interference) based on electromagnetic waves from the electronic components inside the optical module 1.

Similarly, it is necessary to take measures for ESD (Electro-Static Discharge) by separating the shield part and SG (Signal Ground) from each other.

However, in a case where a gap is formed in the groove part 8 where the brim part 4b of the receptacle 4 is provided or is formed in the second stub part receiving hole 13 where the second stub part 4c of the receptacle 4 is inserted due to dimensional tolerance (clearance) of each of the components of the optical module 1 discussed with reference to FIG. 2 or a stress from outside of the optical module 1 discussed with reference to FIG. 4, it is difficult to reduce the influence of electromagnetic interference and take measures for electrostatic discharge.

SUMMARY

According to an aspect of the invention, it is possible to provide an optical module, including a housing including a groove part formed inside the housing; and a receptacle received in the housing, the receptacle to which an optical connector having an optical fiber is connected, the receptacle including a brim part and a stub part where the brim part is formed in a body; wherein an elastic body is provided in the groove part, the groove part where the brim part is provided; and wherein the elastic body is configured to adhere to and hold the stub part.

Additional objects and advantages of the embodiments are set forth in part in the description which follows, and in part will become obvious from the description, or may be learned by practice of the invention.

The object and advantages of the invention may be realized and attained by means of the elements and combinations particularly pointed out in the appended claims.

It is to be understood that both the foregoing general description and the following detailed description are exemplary and explanatory and are not restrictive of the invention as claimed.

DETAILED DESCRIPTION OF THE PREFERRED EMBODIMENTS

Preferred embodiments of the present invention will be explained with reference to accompanying drawings.

The embodiments provide an optical module whereby generation of coupling loss of light due to optical axis shift can be prevented and it is possible to reduce the influence of electromagnetic interference and take measures for electrostatic discharge, even if there is dimensional tolerance (clearance) in each of the components of the optical module and a stress is applied to the optical connector connected to the optical module.

Figure 1:
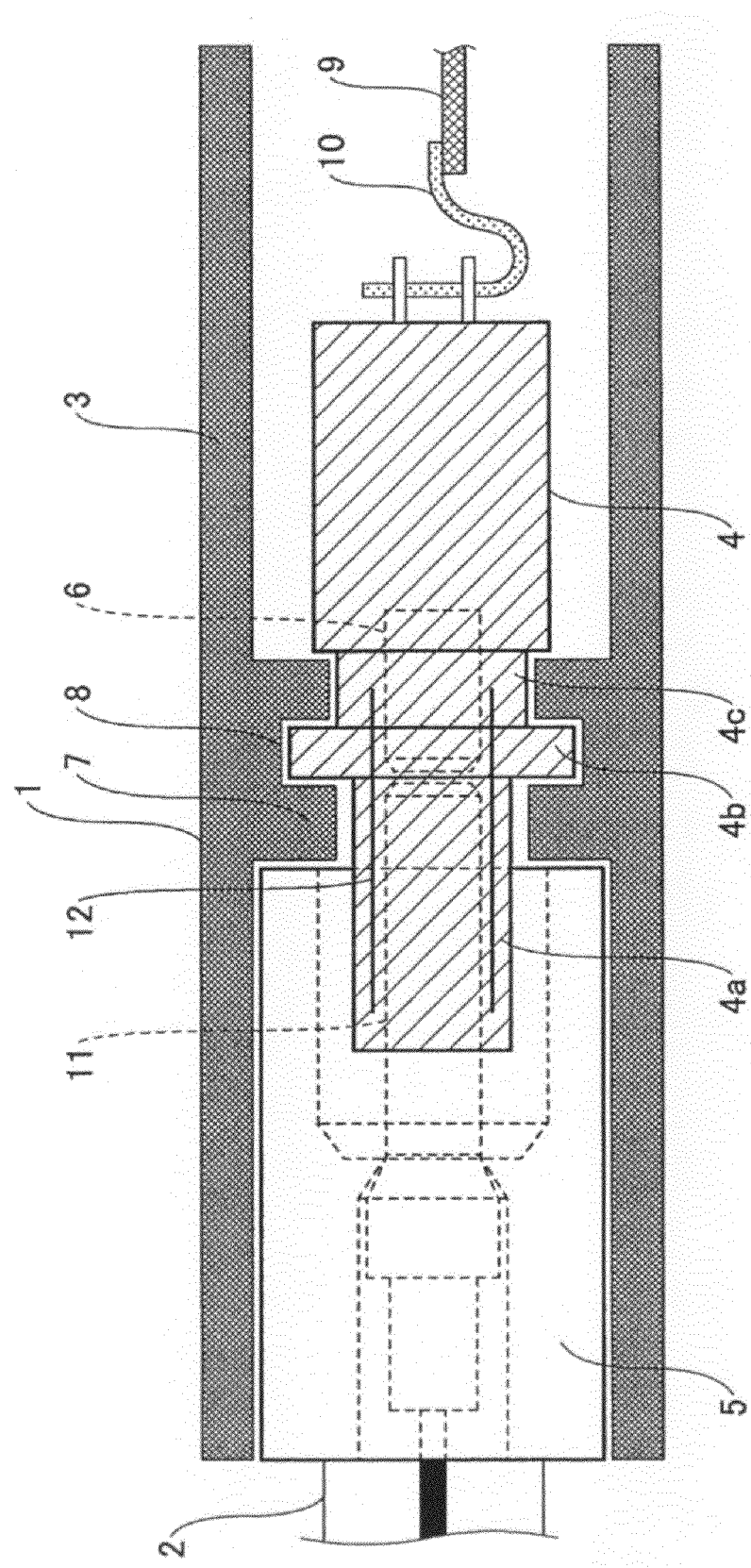
FIG. 1 is a schematic cross-sectional view illustrating a structure of a related art optical module.
Figure 2:
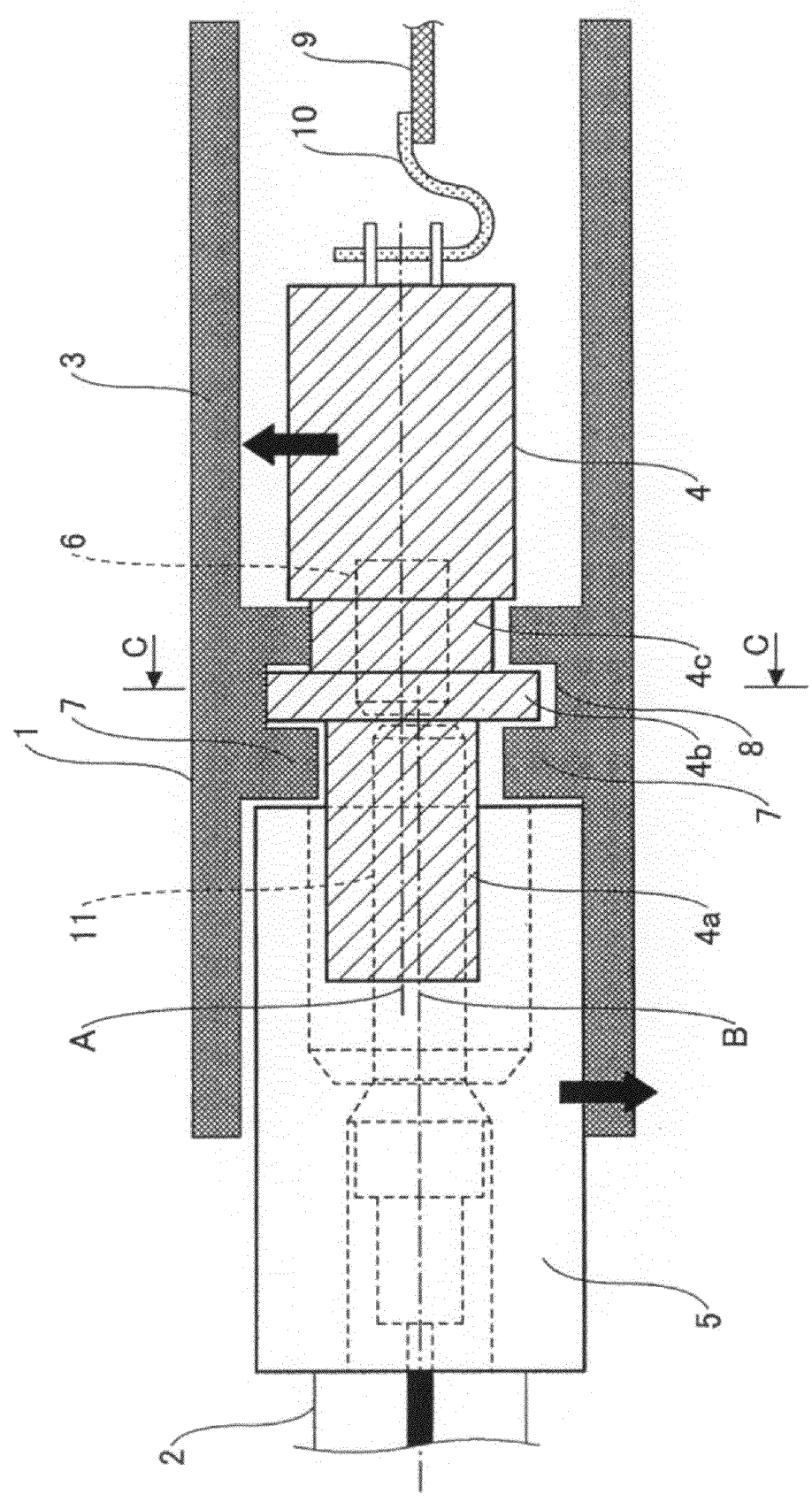
FIG. 2 is a first view for explaining problems of the optical module illustrated in FIG. 1.
Figure 3:
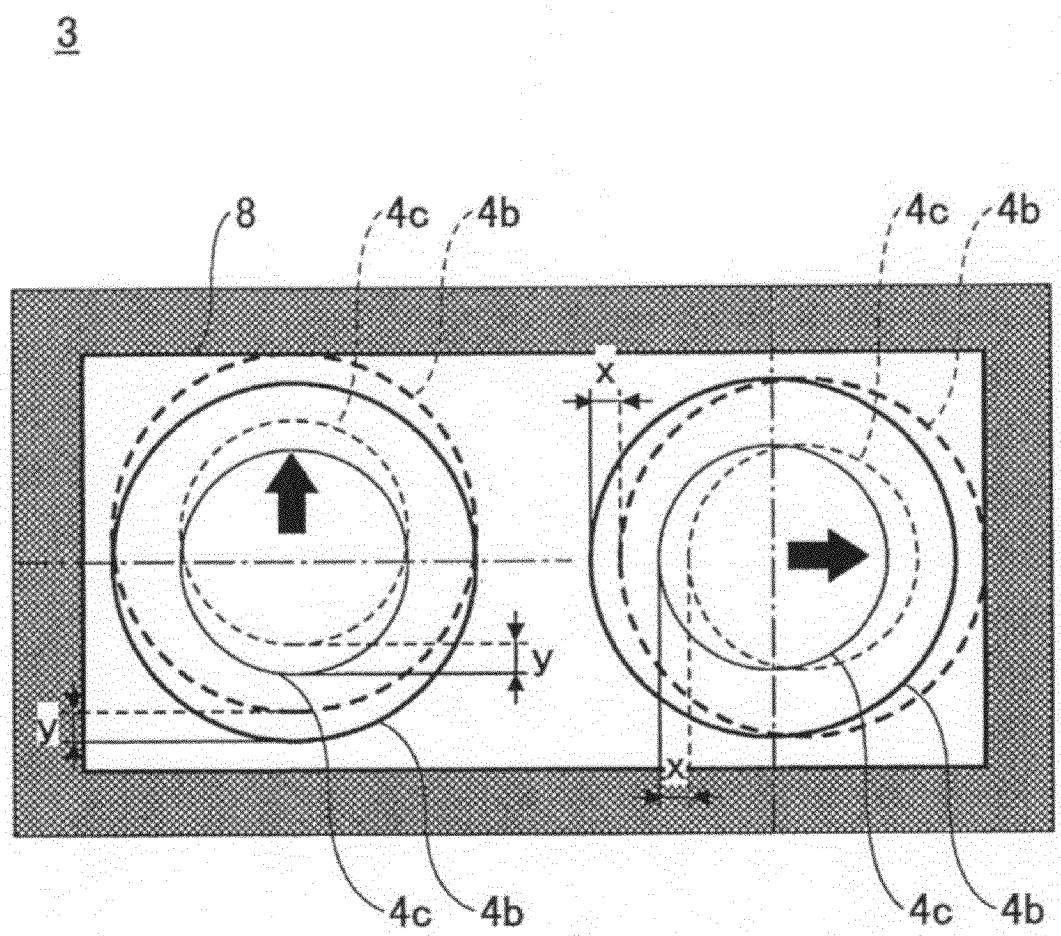
FIG. 3 is a second view for explaining problems of the optical module illustrated in FIG. 1.
Figure 4:
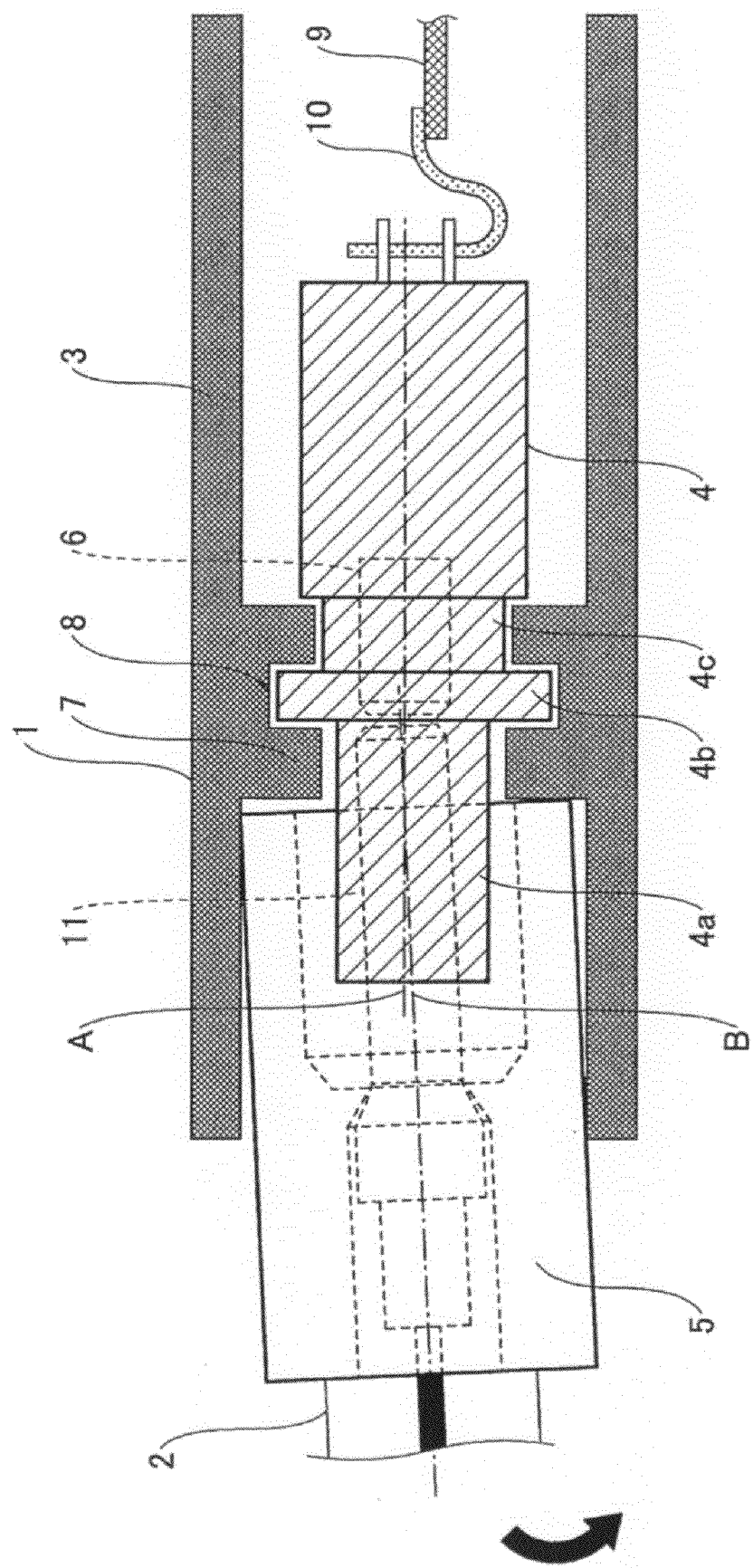
FIG. 4 is a third view for explaining problems of the optical module illustrated in FIG. 1.
Figure 5:
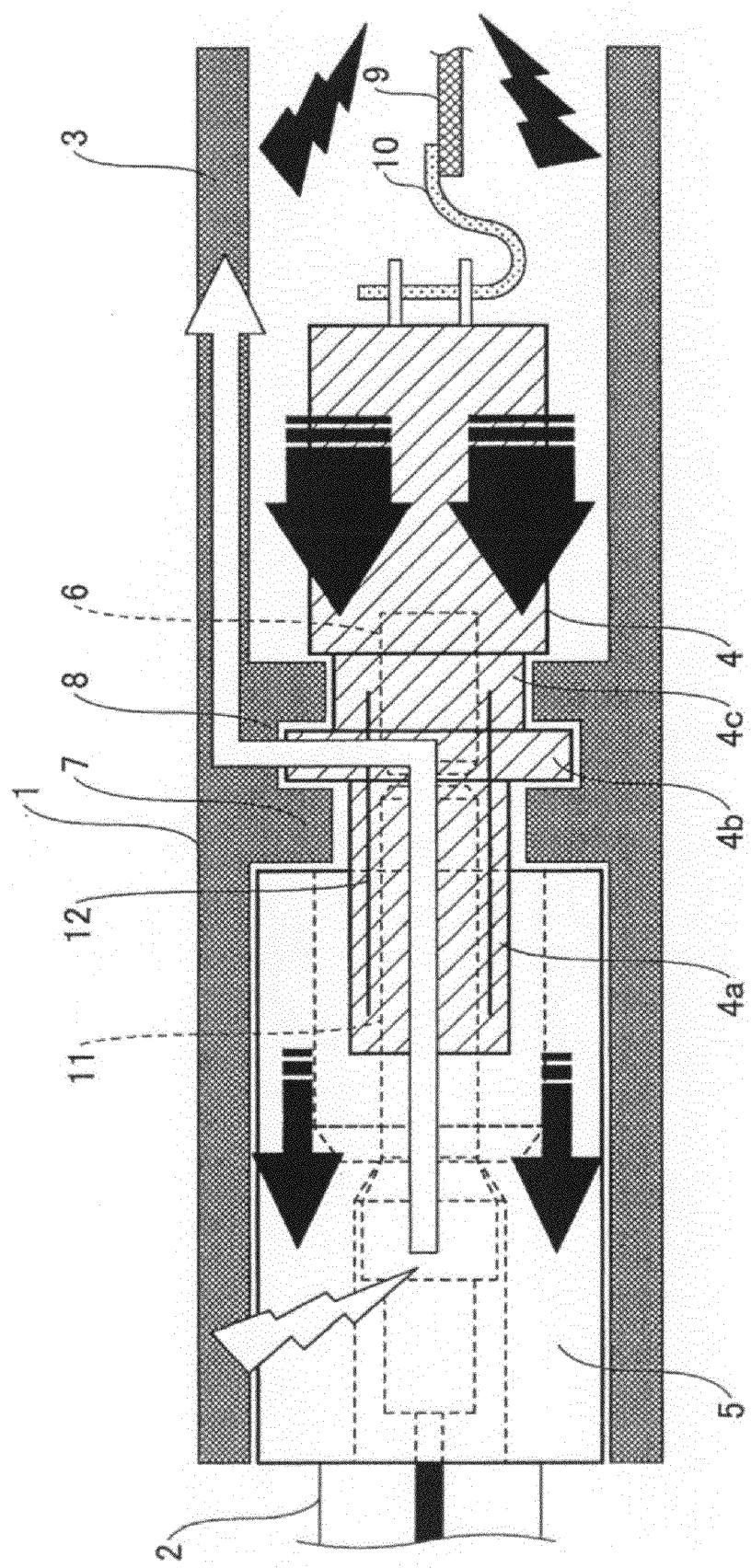
FIG. 5 is a fourth view for explaining problems of the optical module illustrated in FIG. 1.
Figure 6:
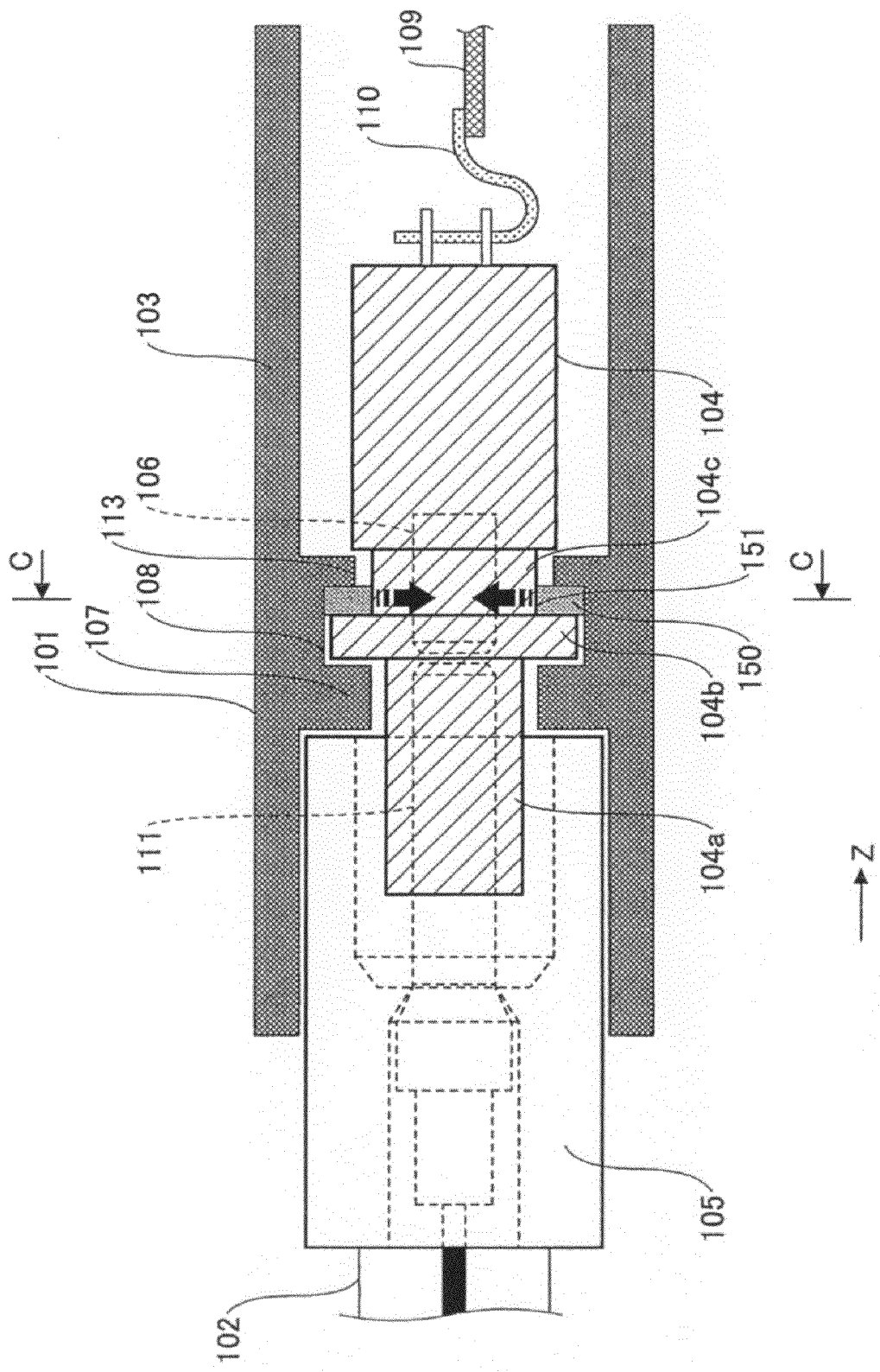
FIG. 6 is a schematic cross-sectional view illustrating a structure of an optical module of an embodiment.

FIG. 6 is a schematic cross-sectional view illustrating a structure of an optical module of the embodiment.

Referring to FIG. 6, at the time of communication, an external line optical cable 102 is connected to an optical module 101 such as a light emitting module or a light receiving module used for an optical communication device or the like.

The optical module 101 includes a housing 103 made of metal. A receptacle 104 and an optical connector 105 are received inside the housing 103. An optical semiconductor element (not illustrated) which is a light emitting element or a light receiving element such as a laser diode or a photo diode is provided inside the receptacle 104. The optical connector 105 is provided at a head end part of the external line optical cable 102.

The receptacle 104 having an inside where a ferrule 106 is received includes a first stub part 104a, a brim part 104b, and a second stub part 104c (which corresponds to a stub part of the following claims). The first stub part 104a is provided at a head end side of the receptacle 104. The first stub part 104a is provided in a concave part of the optical connector 105 and configured to guide an internal surface of the concave part. The brim part 104b has a diameter greater than that of the first stub part 104a. The second stub part 104c has a diameter greater than that of the first stub part 104a and smaller than that of the brim part 104b. The second stub part 104c is provided at the optical semiconductor element side. The ferrule 106 is provided inside the second stub part 104c and holds the brim part 104b.

A convex part 107 is provided at a part of the inside of the housing 3, the part being where the first stub part 104a, the brim part 104b, and the second stub part 104c of the receptacle 104 are positioned.

In addition, a groove part 108 is formed in the convex part 107. The receptacle 104 is provided inside the housing 103 so that the brim part 104b is positioned in the groove part 108. In addition, a second stub part receiving hole 113 is formed in the convex part 107 so as to be in communication with the groove part 108. The second stub part 104c is received in the second stub part receiving hole 113.

An elastic body 150 is adhered and provided in the groove part 108. The elastic body 150 is configured to adhere and hold the second stub part 104c at a part at the second stub part 104c, compared to the brim part 104b of the receptacle 104.

The elastic body 150 is provided between the brim part 104b of the receptacle 104 and the second stub part receiving hole 113. The elastic body 150 is made of, for example, elastomer resin or the like including silicon group resin or the like. For example, a conductive material such as a conductive filler of metal or the like (for example, carbon filler) is contained in the elastic body 150.

A piercing hole 151 is formed in the elastic body 150. The piercing hole 151 is configured to receive and have inserted the second stub part 104c of the receptacle 104.

The elastic body 150 is received in the groove part 108 so as to adhere to the groove part 108 between the brim part 104b of the receptacle 104 and the second stub part receiving hole 113. In addition, the second stub part 104c of the receptacle 104 is inserted in the piercing hole 151 of the elastic body 150.

The optical semiconductor element provided inside the receptacle 104 is connected to a printed wiring board 109 via a flexible wiring board 110. An LSI (Large Scale Integrated Circuit) and others are provided on the printed wiring board 109.

On the other hand, an external surface of the optical connector 105 is guided by an internal wall part of the housing 103. In addition, a ferrule 111 is provided inside the optical connector 105. The ferrule 111 has a cylindrical-shaped configuration so that the external line optical cable 102 is held and fixed.

The ferrules 106 and 111 are arranged precisely by a line sleeve 112 (see FIG. 8) so as to stand in a row. The line sleeve 112 is formed inside the first stub part 104a, the brim part 104b and the second stub part 104c. By connecting the ferrules 106 and 111 to each other, the optical semiconductor element provided in the receptacle 104 and the optical connector 105 are optically and precisely connected to each other.

Figure 7:
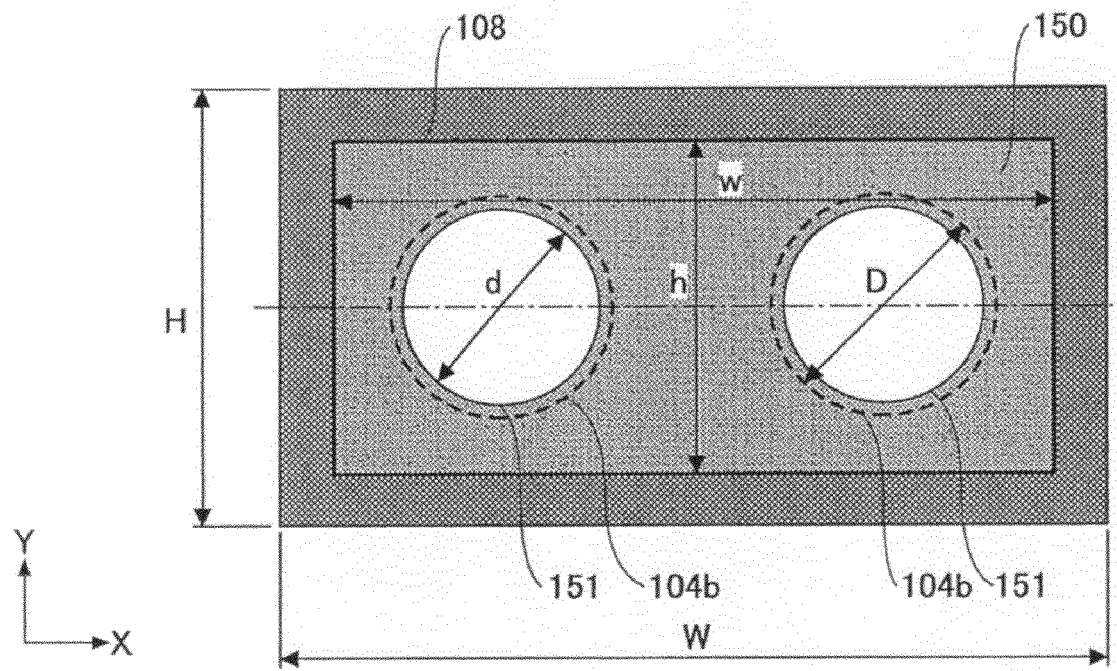
FIG. 7 is a view showing relationships among a groove part, an elastic body, and second stubs of a receptacle illustrated in FIG. 6.

Here, relationships among the groove part 108 illustrated in FIG. 6, the elastic body 150, and the second stub parts 104c of the receptacle 104 are discussed with reference to FIG. 7. FIG. 7 is a cross-sectional view taken along a line C-C in FIG. 6. FIG. 7 illustrates an example where two receptacles 104 are provided in a single housing 103.

Referring to FIG. 7, the compressed elastic body 150 is provided in the groove part 108. An external height H of the elastic body 150 before compression is greater than a height h of the groove part 108 (H>h). An external width W of the elastic body 150 before compression is greater than a width w of the groove part 180 (W>w). When the compressed elastic body 150 is received in the groove part 180 having the above-mentioned size, an elastic compression force by the elastic body 150 is obtained.

In addition, a diameter d of the empty piercing holes 151 formed in the elastic body 150 is smaller than an external diameter D of the second stub parts 104c of the receptacle 104 received in (filling) the respective piercing holes 151 (d<D).

In addition, center positions of the above-mentioned dimensions (positions indicated by a one-dotted center line in FIG. 7) of the groove part 108, the elastic body 150, the piercing holes 151 formed in the elastic body 150, and the second stub parts 104c of the receptacle 104 inserted in the respective piercing holes 151 are substantially the same.

Furthermore, in the groove part 108, the elastic body 150 is adhered, without a gap, between the brim part 104b provided in the groove part 108 and an internal side surface of the groove part 108 at the piercing hole 151 side.

Accordingly, when the elastic body 150 is provided in the groove part 108 and the second stub part 104c of the receptacle 104 is inserted in the piercing hole 151 of the elastic body 150, the elastic body 150 is adhered to the groove part 108, by the elastic force of the elastic body 150, without forming a gap, in a state where the center of the second stub part 104c of the receptacle 104 inserted in the piercing hole 151 is arranged in the ideal center position.

In other words, as indicated by a black arrow in FIG. 6, based on the elastic force compressing from the elastic body 150 to the center side of the second stub part 104c of the receptacle 104, a self arranging function works so that the center of the second stub part 104c is consistent with the ideal center position. As a result of this, a most proper position of the second stub part 104c is held in the X-direction and the Y-direction (see FIG. 7) and the Z-direction (see FIG. 6).

Since the center of the second stub part 104c of the receptacle 104 inserted in the piercing hole 151 is arranged in the ideal center position as discussed above, the ferrule 106 received in the receptacle 104 and the ferrule 111 received in the optical connector 102 are coupled so that optical axes of the ferrule 106 and the ferrule 111 are consistent with each other. Therefore, it is possible to precisely and optically connect the optical semiconductor element provided in the receptacle 104 and the optical connector 105 to each other.

In addition, as discussed above, the conductive material, for example, the conductive filler of metal or the like such as the carbon filler is contained in the elastic body 150. Therefore, a state where the elastic body 150 is electrically connected to the housing 103 is formed.

Figure 8:
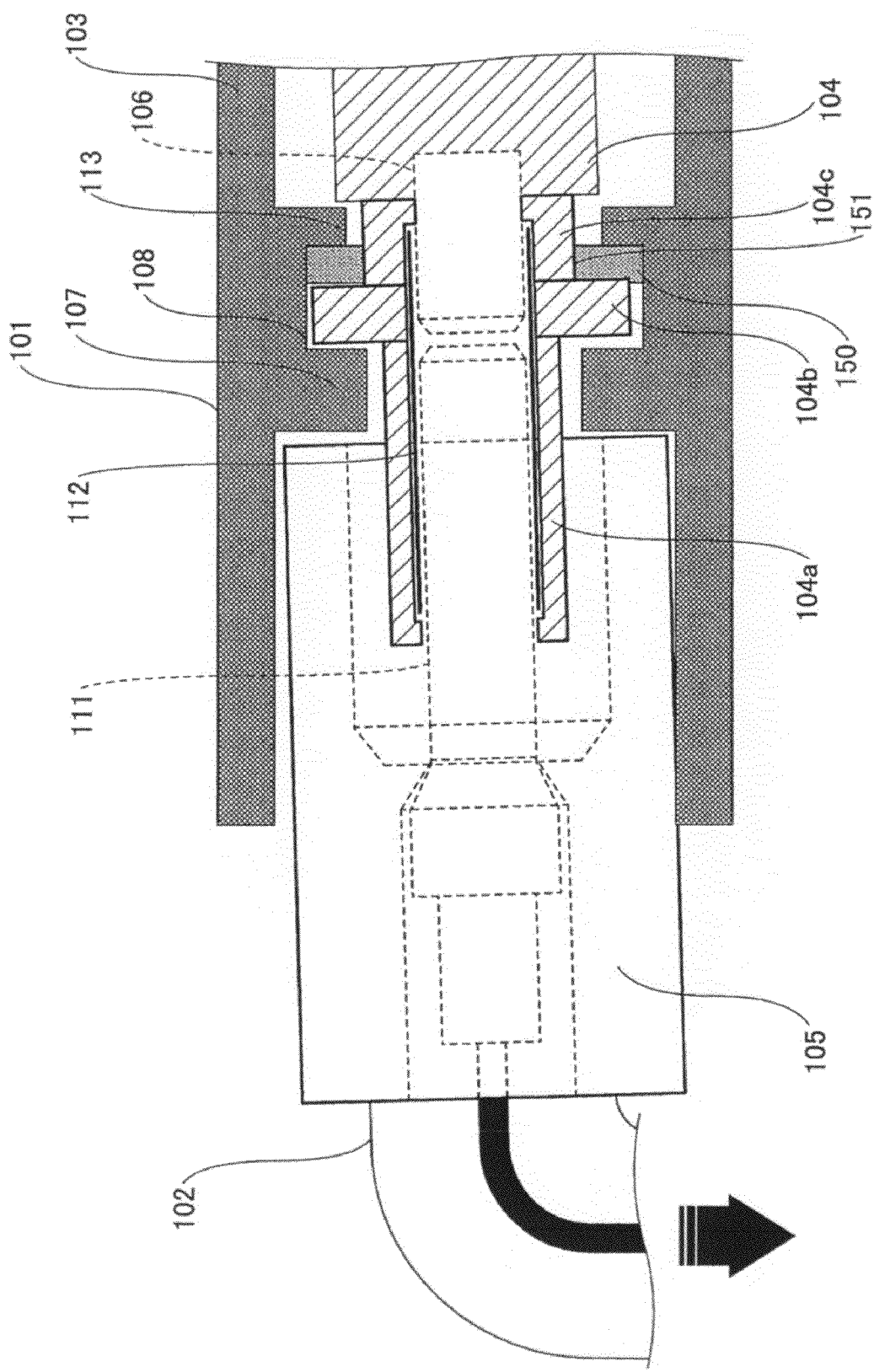
FIG. 8 is a first view for explaining an effect of the optical module illustrated in FIG. 6.
Figure 9:
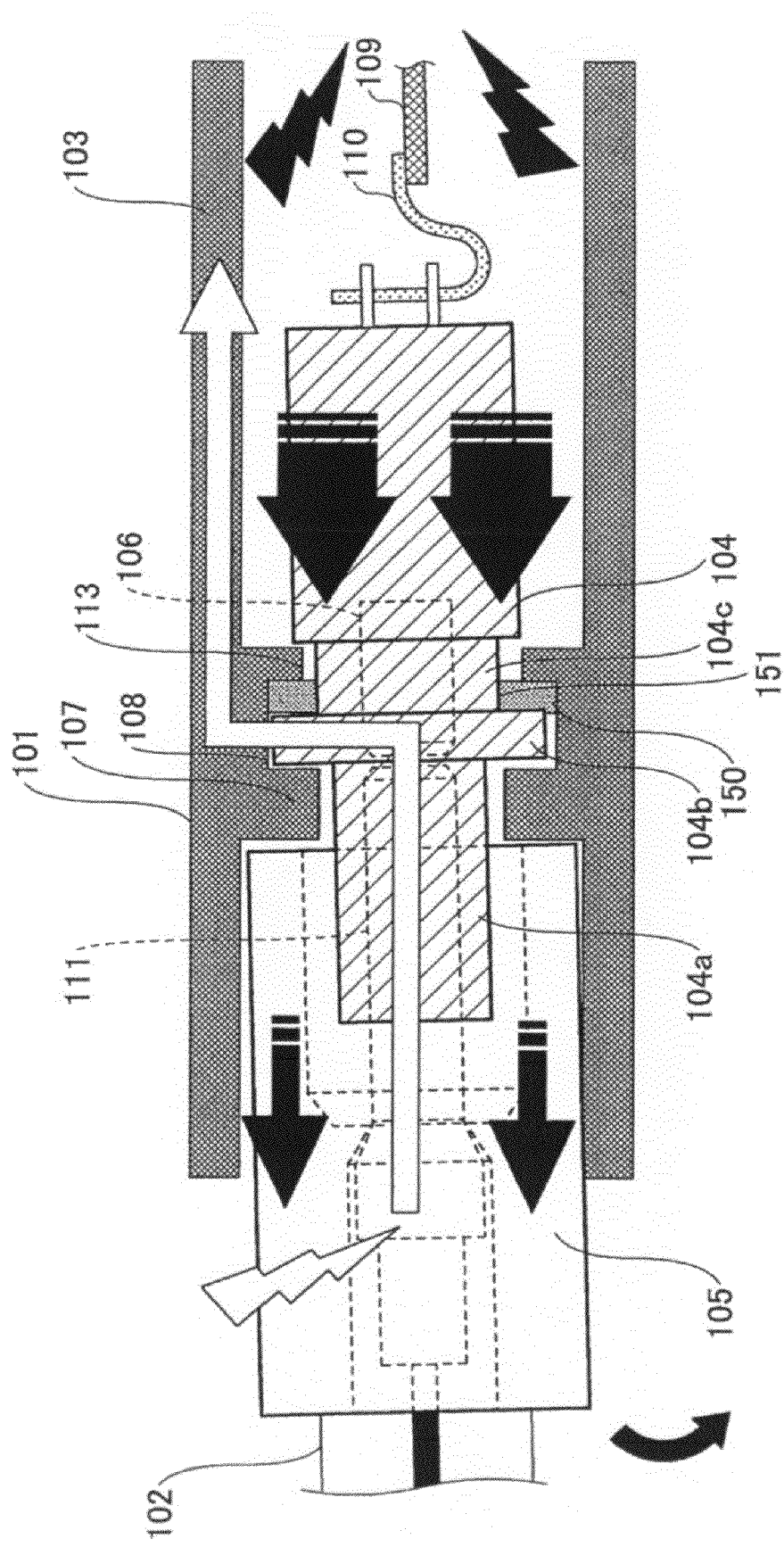
FIG. 9 is a second view for explaining the effect of the optical module illustrated in FIG. 6.

An effect of the optical module 101 having the above-mentioned structure is discussed with reference to FIG. 8 and FIG. 9. Here, FIG. 8 and FIG. 9 are first and second views for explaining the effect of the optical module 101 illustrated in FIG. 6. In FIG. 8, a connection relationship between the optical module 101 of the embodiment having the elastic body 150 and the optical connector 102 is mainly illustrated.

Referring to FIG. 8, in this example, the elastic body 150 having the size illustrated in FIG. 7 is received in the groove part 108 between the brim part 104b of the receptacle 104 and the second stub part receiving hole 113 so as to adhere to the groove part 108.

Accordingly, even if the optical connector 105 provided at the head end part of the external line optical cable 102 used at the time of communication is connected to the optical module 101 and an external stress is applied to the optical connector 105 as indicated by a black arrow in FIG. 8, the elastic body 150 is expanded and compressed so that a part of the elastic body 150 is crushed. Because of this, the receptacle 104 (the second stub part 104c) inserted in the piercing hole 151 of the elastic body 150 can follow this.

Accordingly, even if the external stress is applied to the optical connector 105 as indicated by a black arrow in FIG. 8, it is possible to prevent a shift between the position of an optical axis of the ferrule 111 provided inside the optical connector 105 and the position of an optical axis of the ferrule 106 provided inside the receptacle 104. Hence, it is possible to prevent degradation of the optical output due to coupling loss of light.

In a non-stress state where the external stress indicated by a black arrow in FIG. 8 is not applied to the optical connector 105, based on the elastic force compressing from the elastic body 150 to the center side of the second stub part 104c of the receptacle 104, the self arranging function works so that the center of the receptacle 104 (the second stub part 104c) inserted in the piercing hole 151 of the elastic body 150, namely the center of the ferrule 106 provided inside the receptacle 104, is consistent with the ideal center position. As a result of this, a most proper position is maintained.

Next, FIG. 9 is referred to.

As discussed above, the conductive material such as the conductive filler of metal or the like (for example, the carbon filler) is contained in the elastic body 150. Such an elastic body 150 is received in the groove part 108 between the brim part 104b of the receptacle 104 and the second stub part receiving hole 113 so as to adhere to the groove part 108. Accordingly, the elastic body 150 is electrically connected to the housing 103.

In other words, the elastic body 150 containing the conductive material is provided between the brim part 104b of the receptacle 104 and the second stub part receiving hole 113 without forming gaps in the groove part 108 where the brim part 104b of the receptacle 104 and in the second stub part receiving hole 113 where the second stub part 104c of the receptacle 104 is inserted.

Therefore, a shield part (a part surrounded by a dotted line in FIG. 9) against electromagnetic waves is formed by the elastic body 150, the brim part 104b and the second stub part 104c of the receptacle 104 which is an electric conductor, and the housing 103.

By this shield part, as illustrated by the black arrow in FIG. 9, it is possible to achieve reduction of radiation of electromagnetic waves from electronic components inside the optical module 101 and it is possible to reduce the influence of EMI (Electro Magnetic Interference).

Even if a surge (indicated by a while arrow in FIG. 9) from outside of the optical module 101 is transmitted to the first stub part 104a, the brim part 104b and the second stub part 104c of the receptacle 104 which is an electric conductor via the optical connector 105, the elastic body 150 adhering to the groove part 108 is electrically connected between the brim part 104b of the receptacle 104 and the second stub part receiving hole 113. Therefore, the surge is transmitted to an external FG (Frame ground) of the optical module 101 via the housing 103 so that the influence of the surge can be avoided.

Thus, by providing the elastic body 150 containing the conductive material, it is possible to reduce or prevent radiation of the electromagnetic waves from electronic components inside the optical module 101 and it is possible to avoid the influence of surges from outside the optical module 101.

According to the optical module 101 of the embodiment, it is possible to prevent generation of coupling loss of light due to optical axis shift and to reduce the influence of electromagnetic interference and take measures for electrostatic discharge, even if there is dimensional tolerance (clearance) in each of the components of the optical module 101 and a stress is applied to the optical connector connected to the optical module 101.

The present invention is not limited to these embodiments, but variations and modifications may be made without departing from the scope of the present invention.

According to the embodiments, it is possible to provide an optical module whereby generation of coupling loss of light due to optical axis shift can be prevented and it is possible to reduce the influence of electromagnetic interference and take measures for electrostatic discharge, even if dimensional tolerance (clearance) is formed in each of the components of the optical module and a stress is applied to the optical connector connected to the optical module.

The embodiments can be applied to any optical module. More specifically, the embodiments can be applied to an optical module used for, for example, an optical communication device such as a light emitting module or a light receiving module, the optical module connecting to an optical connector having an external line cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority or inferiority of the invention. Although the embodiments of the present invention have been described in detail, it should be understood that various changes, substitutions, and alterations could be made hereto without departing from the spirit and scope of the invention.

What is claimed is:

1. An optical module, comprising:

a housing including a groove part formed along an inner peripheral surface of the housing; and a receptacle received in the housing, the receptacle to which an optical connector having an optical fiber is connected, the receptacle including a first stub part, a stub brim part and a second stub part formed in this order from a head end side of the receptacle in a body of the receptacle, the brim part having an outer diameter greater than an outer diameter of the first stub part, the second stub part having an outer diameter greater than the outer diameter of the first stub part and smaller than the outer diameter of the brim part wherein an elastic body and the brim part are provided in the groove part, the elastic body is configured to adhere to and hold the first stub part relative to the groove part, an empty piercing hole is formed in the elastic body, and an external height H of the elastic body before compression is greater than a height h of the groove part (H>h), an external width W of the elastic body before compression is greater than a width w of the groove part (W>w), and a diameter d of the empty piercing hole formed in the elastic body is smaller than an external diameter D of the receptacle (d<D).

2. The optical module as claimed in claim 1,
wherein the elastic body is adhered and provided in the groove part so as to adhere and hold the first stub part in a portion of the groove part, at a side of the first stub part compared to a side of the brim part of the receptacle.

3. The optical module as claimed in claim 1,
wherein the first stub part of the receptacle is inserted in the piercing hole.

4. The optical module as claimed in claim 1,
wherein center positions of the groove part, the elastic body, the piercing hole formed in the elastic body, and the first stub part are arranged to be substantially the same.

5. The optical module as claimed in claim 1,
wherein respective ferrules are provided inside the optical connector and the receptacle; and
wherein an optical axis of each of the ferrules is substantially consistent with the optical axis of the other ferrule.

6. The optical module as claimed in claim 1,
wherein the elastic body is made of a material including silicon group resin.

7. The optical module as claimed in claim 1,
wherein the elastic body is made of a material including a conductive material.

8. The optical module as claimed in claim 7,
wherein the conductive material is a conductive filler of metal.

* * * * *

UNITED STATES PATENT AND TRADEMARK OFFICE
CERTIFICATE OF CORRECTION

PATENT NO.       : 8,192,094 B2                                    Page 1 of 1
APPLICATION NO.  : 12/458785
DATED            : June 5, 2012
INVENTOR(S)      : Kazuya Sasaki et al.

It is certified that error appears in the above-identified patent and that said Letters Patent is hereby corrected as shown below:

Column 9, Line 15, In Claim 1, delete "part" and insert -- part, --, therefor.

Signed and Sealed this
Twenty-eighth Day of August, 2012

David J. Kappos
*Director of the United States Patent and Trademark Office*